United States Patent [19]
Barclay

[11] 3,783,540
[45] Jan. 8, 1974

[54] VIEWING APPARATUS
[75] Inventor: Roger Barclay, Vernet Les Bains, France
[73] Assignees: Pierre Naguet, Le Grand; Societe Anonyme Laboservice, Toulouse, France
[22] Filed: Mar. 27, 1972
[21] Appl. No.: 238,295

[30] Foreign Application Priority Data
Apr. 19, 1971  France .............................. 7113683

[52] U.S. Cl. .............................. 40/78.07, 40/64 A
[51] Int. Cl. ............................................ G09f 11/30
[58] Field of Search ....................... 40/78.03, 78.07, 40/79, 106.1, 36, 63 A, 64 A

[56] References Cited
UNITED STATES PATENTS
3,377,727  4/1968  Weggeland ........................ 40/78.07
3,696,537  10/1972  Alleman ............................. 40/78.07

Primary Examiner—Robert W. Michell
Assistant Examiner—J. H. Wolff
Attorney—David S. Fishman et al.

[57] ABSTRACT

Apparatus for receiving a stack of flat objects and for serially presenting such objects to a viewing window is disclosed. The viewing apparatus includes a manually operated reciprocal slide member which withdraws objects from the top of a stack and returns the withdrawn objects to the bottom of the stack whereby the objects are advanced upwardly in the stack for viewing.

10 Claims, 6 Drawing Figures

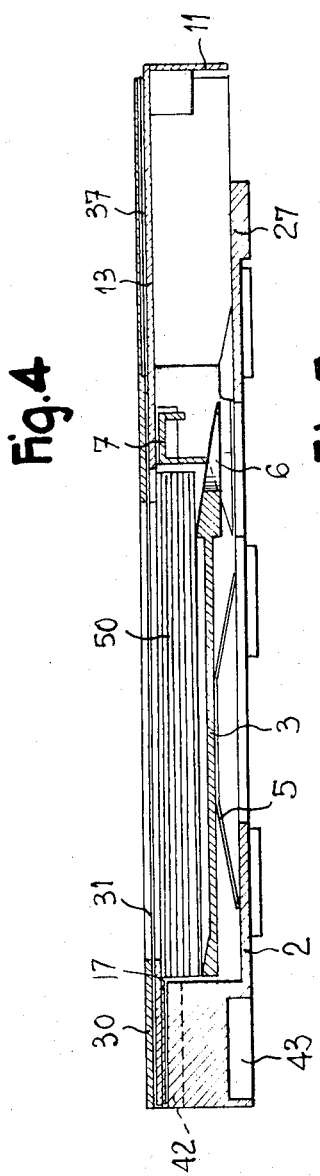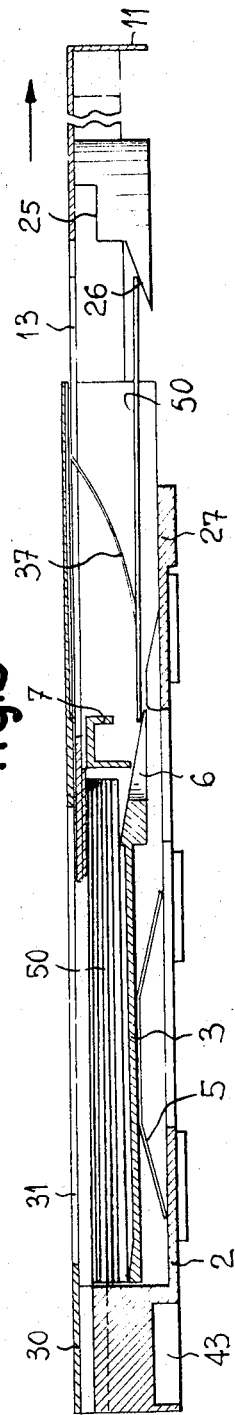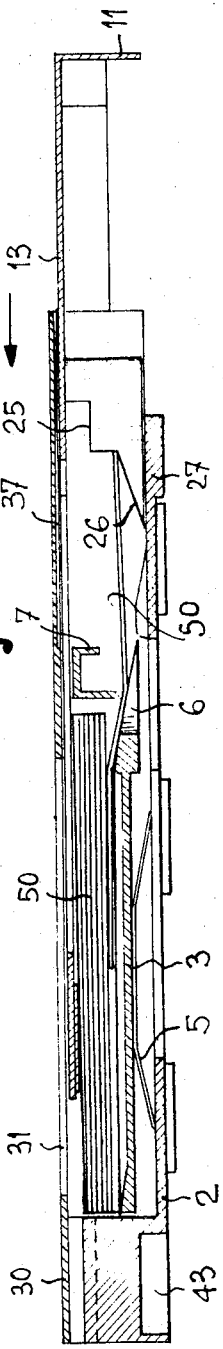

VIEWING APPARATUS

BACKGROUND OF THE INVENTION

1. Field of the Invention

The present invention relates to the display, in serial fashion, of flat items such as photographic prints. More specifically, this invention is directed to inexpensive and lightweight apparatus for containing a stack of flat objects and for presenting each object before a viewing aperture in succession. Accordingly, the general objects of the present invention are to provide novel and improved methods and apparatus of such character.

2. Description of the Prior Art

While not limited thereto in its utility, the present invention is particularly well suited for the displaying of pictures singly and in a preselected sequence. Various devices have been proposed in the prior art for presenting, to a viewing window, photographic prints, postcards and the like. The prior art devices have, however, been relatively complicated from a mechanical viewpoint and thus have been too expensive and cumbersome to achieve widespread use.

SUMMARY OF THE INVENTION

The present invention overcomes the above briefly discussed and other disadvantages of the prior art by providing inexpensive and uncomplicated apparatus which is suitable for distribution with photographic prints to enhance the attrativeness of the presentation of such prints. The foregoing and other objects of the invention are achieved by apparatus which contains a stack of flat objects, such as photographic prints, and by means of a single mechanical manipulation successively presents each object from the stack to a viewing window or aperture.

Apparatus in accordance with the present invention includes a body of generally rectangular shape having an open upper portion. A transverse bar extends across the opening and, in cooperation with an end member and the two longitudinal sides of the body, defines a housing for receiving a stack of flat objects such as photographic prints. Resilient means are provided at the bottom of the thus defined housing in the interest of forcing the pile of objects upwardly. The apparatus also includes a slide member which is mounted for reciprocating longitudinal movement on the body. The slide member is provided with a viewing aperture or window of slightly smaller size than the housing portion of the body. The slide member is also provided, on its underside, with projections which engage a first side edge of the uppermost object in the stack when the slide is moved in a first direction. The slide member is further provided, adjacent the side of the window therein disposed oppositely of the projections, with guide means which assist in the direction of objects drawn off of the stack. The guide means engage a second side edge of a withdrawn object during movement of the slide member in the second direction and direct the object to the bottom of the stack. The positioning of the transverse bar is such that objects drawn off of the stack will pass over the bar as the slide moves in the first direction and such removed objects will thereafter be directed under the bar to the bottom of the stack when the direction of movement of the slide is reversed.

Apparatus in accordance with the present invention may also be characterized by a plate member which is positioned in the bottom of the body housing and resiliently urged upwardly. This plate member serves to protect the flat objects in the stack from direct contact with the resilient means, which comprise spring members in the form of strips, and tends to prevent undesirable canting of the stack of objects. The plate member may be provided with tapering teeth which assists in guiding objects returned to the stack to bottom thereof; the tapered teeth extending under the transverse bar in the body.

A preferred embodiment of the present invention also includes a cover which is secured to the body. The cover is provided with a viewing aperture aligned with the housing defined by the body and having substantially the same dimensions as the aperture in the slide member. The cover is also provided with resilient means, located remotely from the window in the direction of slide movement, for urging objects drawn off the stack toward the bottom of the body.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIGS. 4, 5 and 6 are cross sectional, side elevation views of the embodiment of FIG. 1 depicting various steps in an operational sequence.

DESCRIPTION OF THE PREFERRED EMBODIMENT

Figure 3:
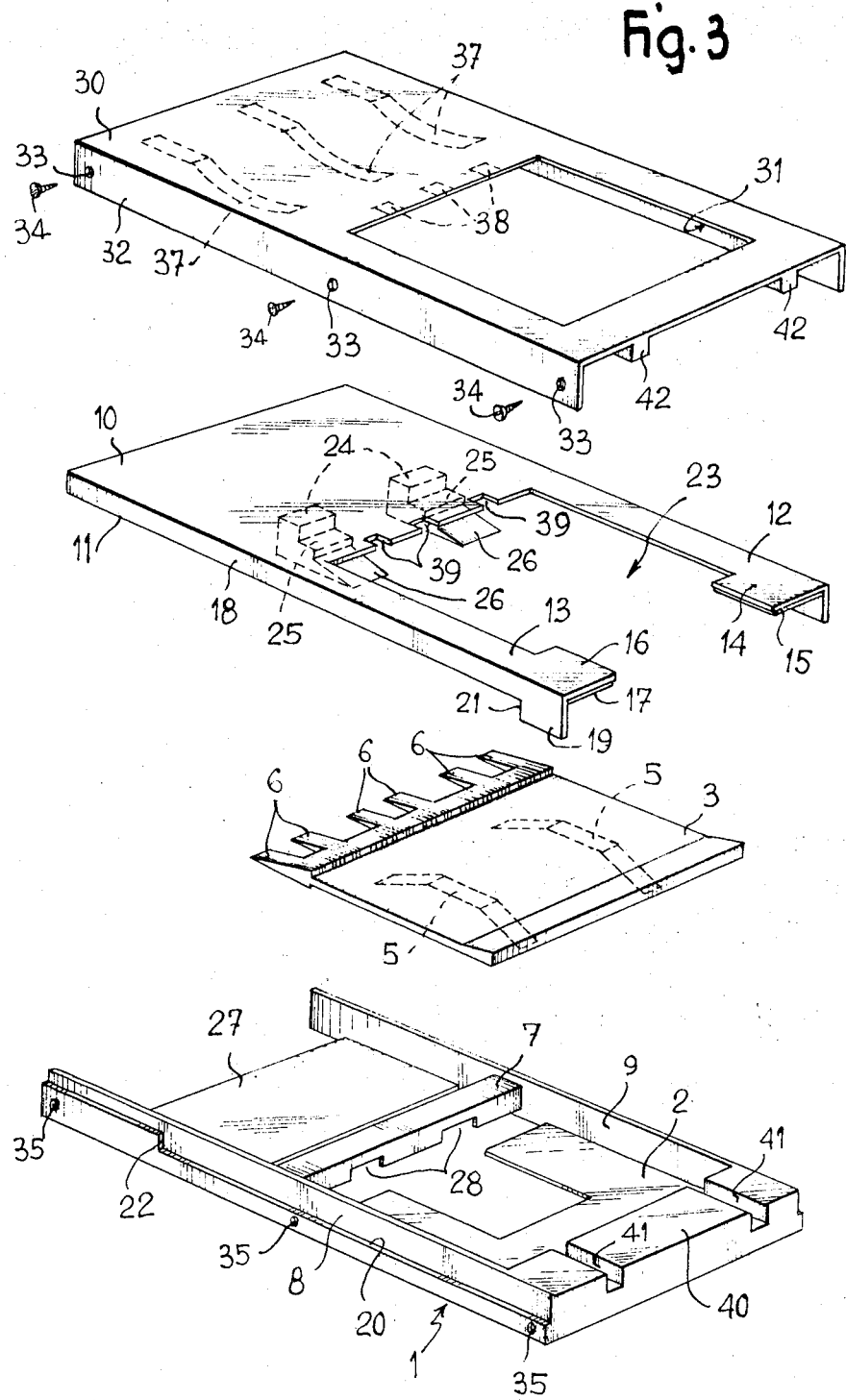
FIG. 3 is an exploded perspective view of the apparatus as shown in FIGS. 1 and 2, FIG. 3 viewing the apparatus in the opposite direction when compared to FIGS. 1 and 2.

With particular reference to FIG. 3, the disclosed embodiment of the present invention comprises a body 1 of generally parallelopiped shape. The body 1 defines, between oppositely disposed side walls 8 and 9, a recess which includes a housing portion or cavity 2. A plate member 3 is installed in the bottom of housing portion 2 and is urged upwardly by a pair of spring members 5 which bear against the bottom of housing portion 2.

As may best be seen from a joint consideration of FIGS. 3 and 4, a first edge of plate member 3 has three pairs of tapered teeth 6 formed integrally therewith. The teeth 6 extend below a transversely oriented bar 7 which interconnects the two sidewalls 8 and 9 of body 1.

A slide member 10 is mounted on body 1 and is movable with respect thereto in the manner to be described below. The slide member 10 has, at a first end, a downwardly extending edge 11 which serves as a grip to facilitate manual reciprocation of the slide. At the end opposite to edge 11 the slide member 10 has a pair of arm extensions 12 and 13. The free end of arm 12 is provided with a broadened portion 14 which extends inwardly toward the opposite arm 13. Similarly, arm 13 comprises a broadened portion 16 at its free end. The undersides of broadened portions 14 and 16 of the arms are respectively provided with downwardly extending stops or projections 15 and 17. Projection 17 may be clearly seen in FIG. 4. The purpose of the projections 15 and 17 will become apparent from the discussion below.

The longitudinal edges of slide member 10, including the arm extensions, terminate with downwardly extending lateral edges 18. These lateral edges 18 extend the length of the slide member and, in the vicinity of the broadened portions 14 and 16 of arm extensions 12 and 13, are provided with downwardly extending runner portions 19. The junction of each runner portion 19 and its associated lateral edge 18 defines a shoulder 21. The side walls 8 and 9 of the body 1 are provided with longitudinal shoulders 20 which define guides along which the runners 19 move. The shoulders 20 are provided with a step, defined by a lateral step or shoulder portion 22, and the bases of edges 18 of the slide member are supported at all times on the portion of shoulder 20 to the left of the stop 22 considering the device as shown in FIG. 3. The limit of movement of the slide member 10 in a first direction, commensurate with a withdrawal stroke, is determined by cooperation between shoulders 21 on the slide and the stop shoulders 22 on body 1.

The arm extensions 12 and 13 of slide member 10 define a window 23 of slightly similar dimension than housing portion 2 of body 1. On the same side of window 23 as gripping edge 11, the slide member is provided, on its lower face, with a pair of shoes 24. These shoes may most clearly be seen from FIG. 5. Each of shoes 24 has a step 25 which is terminated by an inclined ramp 26. The bottom of shoes 24 slide on a base member 27 which in part defines the bottom of the body 1. The longitudinal bar 7 of body 1 is provided with a pair of cut-outs or grooves 28 which, with the slide member fully inserted as shown in FIG. 4, receive the shoes 24.

The apparatus is completed by a cover member 30. Member 30 is provided with a window 31 having the same dimensions as window 23 in slide member 10. The cover member 30 is also provided with oppositely disposed side members 32 which are provided with holes 33. Holes 33 receive screws 34 which engage threaded holes 35 in the walls 8 and 9 of body 1.

While other spring loaded means could be employed, the cover member 30 in the preferred embodiment has a plurality of curved resilient strips 37 affixed to the inwardly disposed surface thereof. Also, in the vicinity of the edge of window 31 juxtapositioned to strips 37, cover member 30 is provided with stops 38. These stops cooperate with grooves 39, which are provided at the corresponding edge of the window 23 in slide member 10, to limit the degree of motion of the slide member in the second or insertion direction.

Returning to a consideration of the body 1, it is to be noted that a first end thereof is terminated by solid section 40 which in part defines the housing portion 2. Solid section 40 has, in its upper face, a pair of longitudinal parallel grooves 41. Grooves 41 receive tongues 42 formed on the lower side of cover member 30; cooperation between grooves 41 and tongues 42 insuring registration of the components of the invention during assembly and enhancing the structural integrity of the apparatus. The lower face of solid section 40 is provided with a recess 43, which may be seen from FIGS. 4–7, which may be employed as a grip during reciprocation of the slide member.

Figure 1:
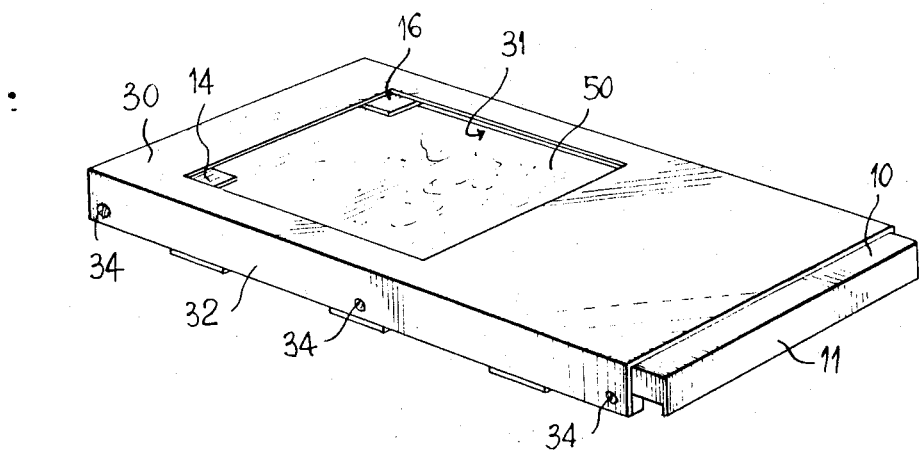
FIG. 1 is a perspective view of a preferred embodiment of apparatus in accordance with the invention.
Figure 2:
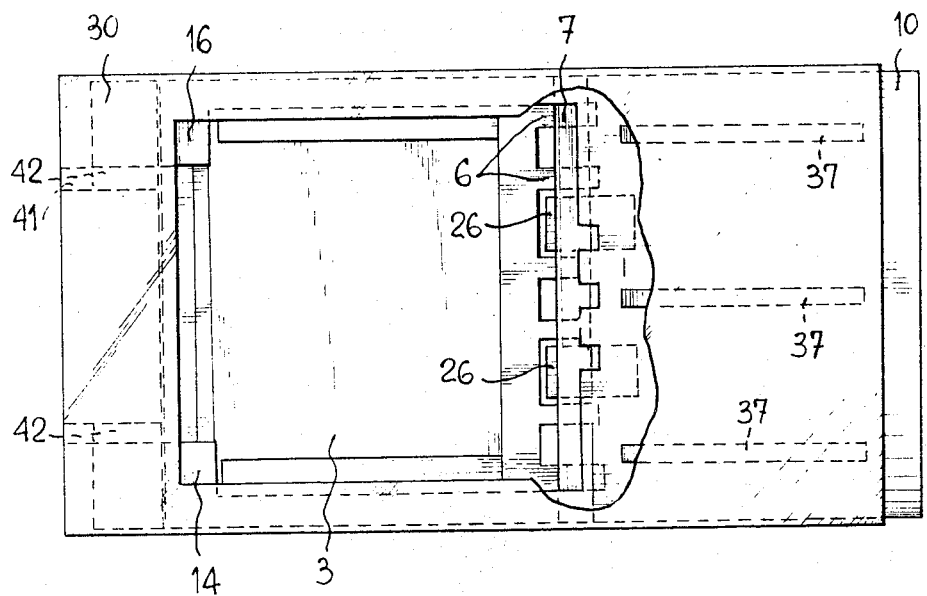
FIG. 2 is a top plan view, partly broken away to facilitate understanding of the invention, of the embodiments of FIG. 1.

In use, a stack of photographic prints 50 or other suitable indicia bearing card-like members are placed upon the plate 3 in the housing portion 2 of body 1. When the apparatus is in the position shown in FIGS. 1, 2 and 4, the windows 23 and 31, respectively in the slide and cover, are in registration and the print 50 located at the top of the stack may be viewed.

To change the presentation the apparatus is held by means of the recess 43 and, employing the grip 11, the slide member 10 is withdrawn in the direction of the arrow on FIG. 5. During outward movement of the slide the projections 15 and 17 on the free ends of arms 14 and 16 abut against the edge of the uppermost object 50 on the pile and withdraw the object by passing it over the bar 7. FIG. 5 depicts the withdrawal of an object and it may be seen that, when the window 23 is located opposite the normally compressed resilient strips 37, the strips are released and force the withdrawn object downwardly. The object 50 directed downwardly by resilient strips 37 is thus caused to rest with a first end on the tapered teeth 6 of plate 3 and its second end on the sloping ramp 26 of shoes 24.

After the slide member 10 has been fully withdrawn, as defined by contact between shoulders 21 on the slide and stop shoulders 22 on body 1, the slide member may be returned to its starting position as shown in FIG. 6. During the return or forward movement of the slide member the projections 15 and 17 slide over the upper surface of the object 50 which has moved to the top of the stack. The dimensioning of the apparatus is such that projections 15 and 17 do not completely clear the stack of objects 50 as slide is moved outwardly but completely clear the stack when the slide is fully inserted as shown in FIG. 4. The object 50 which was removed from the top of the stack will be contacted by the shoulders defined by the step portion 25 of shoes 24 and will be guided by the tapered teeth 6 of plate member 3 under the bar 7 and to the bottom of the stack 50. The withdrawn object will be fully returned to the stack in view of the interleaving of the shoes 24 and tapered teeth 6, as shown in FIG. 4, with the slide member fully inserted.

As will now be obvious to those skilled in the art, succession of different objects 50 may be presented through the aligned viewing windows 31 and 23 merely by reciprocating the slide member 10. Apparatus in accordance with the present invention is uncomplicated, comprises a comparatively small number of components and can be formed from inexpensive plastic materials.

While a preferred embodiment has been shown and described various modifications and substitutions may be made thereto without departing from the spirit and scope of the invention. Accordingly, it is to be understood that the invention has been described by way of illustration and not limitation.

What is claimed is:

1. A viewing apparatus for containing a pile of flat objects for the successive presentation of each object comprising:
 a body of generally rectangular shape, said body comprising a base and a pair of oppositely disposed longitudinal side walls extending upwardly from the base, said side walls in part defining a recess at the upper side of the body;

divider means extending across said body recess normally to said side walls and connecting the two longitudinal side walls intermediate the ends thereof, said divider means cooperating with said side walls to define a cavity in said body for receiving a pile of flat objects, the divider means being of reduced width when compared to the height of said side walls and being positioned with respect to the side walls and base of said body in such a manner as to define a space for the passage of individual of the objects seriatum between the divider means and said base;

plate means positioned in said cavity in said body and movable with respect to the base of said body, said plate means including guide means on the edge thereof juxtapositioned to said divider means for directing objects passed between the divider means and base above said plate means;

first resilient means installed in said body cavity for urging a pile of flat objects positioned therein on said plate means away from said base with respect to said base;

a slide member supported by said body side walls, said slide member being provided with a window of smaller dimensions than the body cavity, said slide member being movable along said body side walls whereby said slide member window is capable of being positioned in registration with said cavity, said slide member further having first projection means adjacent a first edge of the window therein, said projection means extending generally inwardly toward the bottom of said body cavity and adapted to cooperate with one of the edges of a flat object located uppermost on the pile, said slide member also having further inwardly extending projection means positioned adjacent to a second edge of the window disposed opposite to said first window edge, said second projection means being further positioned at least partly to the side of said divider means facing away from said body cavity whereby said second projection means cooperates with said divider means to limit movement of said slide means in a first direction, said first projection means being adapted to withdrawn a flat object located at the upper end of the pile during movement of said slide member in a second direction by passing the object over the divider means and said second projection means pushing the thus withdrawn flat object beneath said divider means to the bottom of the pile when said slide member is moved in the first direction, said slide member further being provided with stop means; and, limit means carried by said body means and cooperating with said slide stop means for limiting motion of said slide member in the first direction.

2. The apparatus of claim 1 wherein said plate means includes:
a first portion for supporting a stack of flat objects; and
a plurality of tapered teeth extending from said first portion under said divider means whereby said teeth cooperate with said divider means for guiding objects returned to the bottom of the pile.

3. The apparatus of claim 2 wherein said divider means comprises:
a continuous transverse bar extending across said body.

4. The apparatus of claim 1 further comprising:
cover mounted on said body means over said slide member, said cover means being provided with a window having substantially the same dimensions as the window in said slide member, said cover means window being in registration with said body cavity and cooperating with said divider means to define a space above said divider means commensurate in width with the thickness of the individual objects.

5. The apparatus of claim 4 wherein said cover means further comprises:
second resilient means positioned above the region of the body to the side of said divider means located opposite to said cavity, said second resilient means being normally compressed against the inner surface of said cover means and extending downwardly through the window in said slide member when said slide member is moved in said first direction to urge flat objects withdrawn from the pile to the vicinity of the bottom of said body.

6. The apparatus of claim 5 wherein said plate means includes:
a first portion for supporting a stack of flat objects; and
a plurality of tapered teeth extending from said first portion under said divider means whereby said teeth cooperate with said divider means for guiding objects returned to the bottom of the pile.

7. The apparatus of claim 6 wherein said slide member further comprises:
a pair of oppositely disposed longitudinal edges which cooperate with the body side walls for guiding the motion of said slide member.

8. The apparatus of claim 7 wherein said divider means comprises:
a continuous transverse bar extending across said body.

9. The apparatus of claim 1 wherein said slide member further comprises:
a pair of oppositely disposed longitudinal edges which cooperate with the body side walls for guiding the motion of said slide member.

10. The apparatus of claim 1 wherein said divider means comprises:
a continuous transverse bar extending across said body.

* * * * *